(12) United States Patent
Ramnath et al.

(10) Patent No.: US 12,444,136 B2
(45) Date of Patent: Oct. 14, 2025

(54) SCENE UNDERSTANDING USING OCCUPANCY GRIDS

(71) Applicant: Magic Leap, Inc., Plantation, FL (US)

(72) Inventors: Divya Ramnath, Sunnyvale, CA (US); Shiyu Dong, Belmont, CA (US); Siddharth Choudhary, San Jose, CA (US); Siddharth Mahendran, Mountain View, CA (US); Arumugam Kalai Kannan, Sunnyvale, CA (US); Prateek Singhal, Mountain View, CA (US); Khushi Gupta, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 187 days.

(21) Appl. No.: 18/275,468

(22) PCT Filed: Feb. 3, 2022

(86) PCT No.: PCT/US2022/015056
§ 371 (c)(1),
(2) Date: Aug. 2, 2023

(87) PCT Pub. No.: WO2022/169938
PCT Pub. Date: Aug. 11, 2022

(65) Prior Publication Data
US 2024/0127538 A1    Apr. 18, 2024

Related U.S. Application Data

(60) Provisional application No. 63/145,868, filed on Feb. 4, 2021.

(51) Int. Cl.
*G06T 17/20* (2006.01)
*G06V 20/64* (2022.01)

(52) U.S. Cl.
CPC .............. *G06T 17/20* (2013.01); *G06V 20/64* (2022.01); *G06T 2210/12* (2013.01)

(58) Field of Classification Search
CPC ...... G06T 17/20; G06T 2210/12; G06V 20/64
See application file for complete search history.

(56) References Cited

U.S. PATENT DOCUMENTS 8,736,636 B2    5/2014 Kang
8,793,770 B2    7/2014 Lim
(Continued)

OTHER PUBLICATIONS

Bagautdinov et al., "Probability occupancy maps for occluded depth images," Paper, Presented at Proceedings of the 2015 IEEE Conference on Computer Vision and Pattern Recognition (CVPR), Boston, MA, Jun. 7-12, 2015, pp. 2829-2837.
(Continued)

*Primary Examiner* — Michelle Chin
(74) *Attorney, Agent, or Firm* — Fish & Richardson P.C.

(57) ABSTRACT

This document describes scene understanding for cross reality systems using occupancy grids. In one aspect, a method includes recognizing one or more objects in a model of a physical environment generated using images of the physical environment. For each object, a bounding box is fit around the object. An occupancy grid that includes a multiple cells is generated within the bounding box around the object. A value is assigned to each cell of the occupancy grid based on whether the cell includes a portion of the object. An object representation that includes information describing the occupancy grid for the object is generated. The object representations are sent to one or more devices.

20 Claims, 11 Drawing Sheets

(56) References Cited

U.S. PATENT DOCUMENTS

| | | | |
|---|---|---|---|
| 8,823,855 | B2 | 9/2014 | Hwang |
| 8,874,673 | B2 | 10/2014 | Kim |
| 2015/0170002 | A1 | 6/2015 | Szegedy et al. |
| 2017/0262972 | A1 | 9/2017 | Adams et al. |
| 2019/0197778 | A1* | 6/2019 | Sachdeva ............... G06F 18/251 |
| 2020/0311481 | A1 | 10/2020 | Tong et al. |
| 2020/0326721 | A1* | 10/2020 | Buerkle ................ G06T 7/0002 |
| 2021/0334556 | A1* | 10/2021 | Vignard ................ G06V 20/58 |

OTHER PUBLICATIONS

Extended European Search Report in European Appln. No. 22750371.1, dated May 22, 2024, 9 pages.

Gao et al., "A segmentation-aware object detection model with occlusion handling," Paper, Presented at Proceedings of the CVPR'11 2011 IEEE Conference on Computer Vision and Pattern Recognition, Colorado Springs, CO, Jun. 20-25, 2011, pp. 1361-1368.

Wada et al., "3D object segmentation for shelf bin picking by humanoid with deep learning and occupancy voxel grid map," Paper, Presented at Proceedings of the 2016 IEEE-RAS 16th International Conference on Humanoid Robots (Humanoids), Cancun, Mexico, Nov. 15-17, 2016, pp. 1149-1154.

Office Action in Japanese Appln. No. 2023-547211, mailed on Nov. 25, 2024, 6 pages (with English translation).

International Search Report and Written Opinion in International Appln. No. PCT/US2022/015056, mailed May 12, 2022, 8 pages.

\* cited by examiner

SCENE UNDERSTANDING USING OCCUPANCY GRIDS

CROSS REFERENCE TO RELATED APPLICATION

This application is a National Stage Application of International Application No. PCT/US2022/015056, filed Feb. 3, 2022, which claims the benefit of U.S. Provisional Application No. 63/145,868 filed on Feb. 4, 2021, which is hereby incorporated by reference in its entirety.

TECHNICAL FIELD

The present disclosure relates to scene understanding for cross reality systems.

BACKGROUND

Computers may control human user interfaces to create an X reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

SUMMARY

This specification generally describes systems and techniques for creating and updating XR environments using occupancy grids for objects. An occupancy grid can represent the areas of the environment occupied by the object. In some implementations, the occupancy grid includes a three-dimensional grid and each cell of the grid can include a value that indicates whether the object occupies the area of the environment represented by the cell. The three-dimensional grid can encompass a bounding box that represents an overall area of the environment in which the object is located.

The occupancy grids can be used to update models, e.g., meshes, that represent the physical world, e.g., to update the location of the objects within the environment. For example, a visualization system can receive images of a physical world from one or more XR display systems. The visualization system can analyze the images to detect objects in the images and determine the location of the objects within the environment. Rather than update the model and send the model to the XR display system of a user, the visualization system can generate an object representation that includes bounding box and occupancy grid information for the object and send the object representation to the XR display system of the user. The XR display system can update the model using the object representation.

In general, one innovative aspect of the subject matter described in this specification can be embodied in methods that include the actions of recognizing one or more objects in a model of a physical environment generated using images of the physical environment. For each object, a bounding box is fit around the object. An occupancy grid that includes a multiple cells is generated within the bounding box around the object. A value is assigned to each cell of the occupancy grid based on whether the cell includes a portion of the object. An object representation that includes information describing the occupancy grid for the object is generated. The object representations are sent to one or more devices. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, assigning a value to each cell of the occupancy grid based on whether the cell includes a portion of the object includes assigning a first value to each cell that includes a portion of the object and assigning a second value different from the first value to each cell that does not include any portion of the object.

Some aspects can include detecting a change to a given object of the one or more objects, generating a new occupancy grid for the given object, and sending the new occupancy grid for the given object to the one or more devices rather than an updated model of the physical environment. Each of the one or more devices can update a local mesh for the physical environment using the new occupancy grid for the given object.

In some aspects, the model includes a plurality of voxels that represent the physical environment. Some aspects can include assigning a semantic label to each voxel based on a type of object recognized in the voxel. Some aspects can include clustering voxels based on the semantic label for each voxel.

The subject matter described in this specification can be implemented in particular embodiments and may result in one or more of the following advantages. Using scene understanding techniques described in this document enables the reconstruction of physical environments with accurate information about the objects found in the physical environments. This more accurate information can enable richer AR content to be placed accurately within the reconstruction. For example, knowing that an object is a table with a flat surface having at least a minimum surface area enables a game application to place appropriate AR content on the table.

Generating occupancy grids that represent the areas of an environment occupied by an object and sending information describing the occupancy grid to AR systems rather than updated models, e.g., meshes, that represent an environment reduces the latency in transmitting the information and greatly reduces the amount of data storage resources that would be required by AR systems to store the information that is used to reconstruct an environment for display by the AR system. The occupancy grids enable accurate object placement within a reconstruction and space occupancy in a compact form, providing the data storage and latency benefits without sacrificing accuracy. This also enables the bulk of the computation to be performed by servers in the cloud using more powerful computing devices without increasing the latency in updating the models that would otherwise be required to download full meshes of large maps.

In addition, the occupancy grids can better reflect the location and occupancy of objects than bounding blocks that represent an outline of the area at which an object is located. Using an occupancy grid for each object can enable accurate representation of the occupancy of multiple objects within a same area, e.g., a chair having its seat located under a table.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
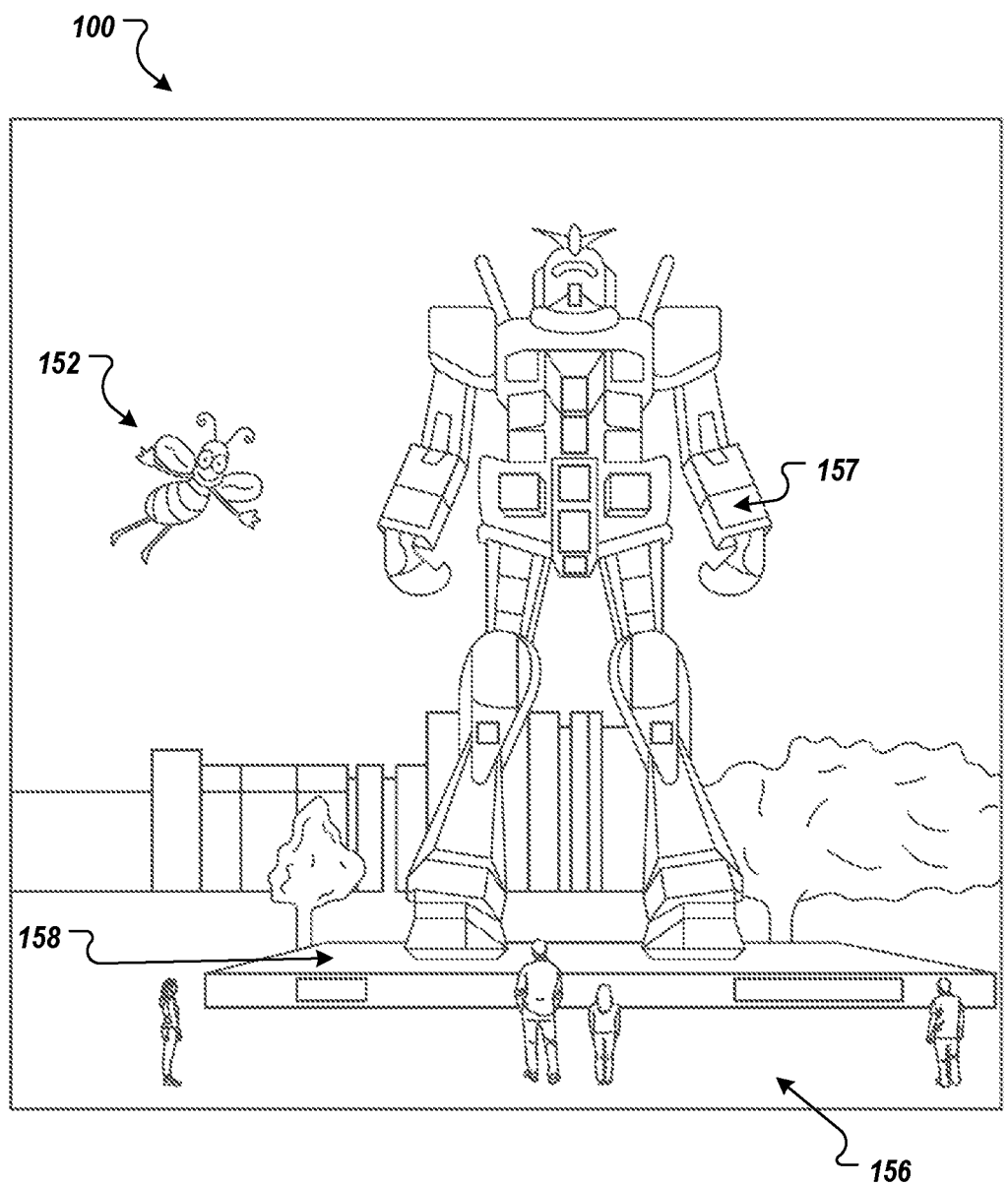
FIG. 1 is a sketch illustrating an example of a simplified augmented reality (AR) scene.

This specification generally describes systems and techniques for using scene understanding to provide X reality (XR or cross reality) scenes that include objects detected in physical environments. To provide realistic XR experiences to multiple users, an XR system must know the users' physical surroundings in order to correctly correlate locations of virtual objects in relation to real objects. An XR system can build an environment map of a scene, which can be created from image and/or depth information collected with sensors that are part of XR devices worn by users of the XR system.

In an XR system, each XR device can develop a local map of its physical environment by integrating information from one or more images collected during a scan at a point in time. In some implementations, the coordinate system of that map is tied to the orientation of the device when the scan was initiated. That orientation can change from session to session as a user interacts with the XR system, whether different sessions are associated with different users, each with their own wearable device with sensors that scan the environment, or the same user who uses the same device at different times.

However, applications executing on the XR system can specify the location of virtual content based on persistent spatial information, such as can be obtained from a canonical map that can be accessed in a shared manner by multiple users interacting with the XR system. The persistent spatial information can be represented by a persistent map. The persistent map can be stored in a remote storage medium (e.g., a cloud). For example, a wearable XR device worn by a user, after being turned on, can retrieve from persistent storage, such as cloud storage, an appropriate stored map that was previously created and stored. Retrieving a stored map can enable use of the wearable device without a scan of the physical world with the sensors on the wearable device. Alternatively or additionally, the system/device, upon entering a new region of the physical world, can similarly retrieve an appropriate stored map.

Sharing data about the physical world among multiple devices can enable shared user experiences of virtual content. Two XR devices that have access to the same stored map, for example, can both localize with respect to the stored map. Once localized, a user's XR device can render virtual content that has a location specified by reference to the stored map by translating that location to a frame of reference maintained by the XR device. The XR device can use this local frame of reference to control the display of the user device to render the virtual content in the specified location.

To support these and other functions, the XR system can include components that, based on data about the physical world collected with sensors on users' XR devices, develop, maintain, and use persistent spatial information, including one or more stored maps. These components can be distributed across the XR system, with some operating, for example, on a head mounted portion of an XR device. Other components can operate on a computer, associated with the user coupled to the head mounted portion over a local or personal area network. Yet others can operate at a remote location, such as at one or more servers accessible over a wide area network.

These components, for example, can include a map merge component that can identify from information about the physical world collected by one or more user devices information that is of sufficient quality to be stored as or in a persistent map. Map merge components can receive inputs from XR devices and determine the suitability of parts of the inputs to be used to update a map, which can be in canonical form. The maps can be provided to the XR devices of the users.

Scene understanding components can be used to detect and/or recognize objects, generate representations of the objects, and reconstruct the objects within a map. Object recognition can refer to interaction or intelligence with objects in a scene of an environment. Scene understanding can refer to the ability to understand the scene semantics and/or understand/extract knowledge about the scene. Persistent and shareable objects/semantics are important to enable intelligent maps and multi-person, e.g., multi-player experiences.

Scene understanding is the ability to identify the semantics of the scene, including stuff (e.g., background such as walls, floors, ceilings), and objects. It allows to distinguish into scene semantics such as static vs dynamic, material, and lighting.

Scene understanding can be used for semantic aware user interaction in an XR environment. For example, scene understanding can be used to locate floors, walls, and ceilings planes for attaching game content; locate the mesh of sofas, chairs, tables, or other furniture for attaching game content; estimate floor level and room layout; raycast to get object labels; and/or for semantic aware physics.

Using scene understanding, the maps can include more accurate information about the objects in the physical environment. The scene understanding computations can be performed using remote servers, e.g., in the cloud, remote from XR devices of users. This cloud-based approach can support multi-user applications that use the same map for uniform experiences between users. As very large areas may need to be mapped in some implementations, it can be more practical, and much faster, to generate and label maps using robust servers rather than XR devices of users. This also enables such computations to be performed offline instead of realtime processing. A cloud-based approach can also support enterprises that may want to construct a map of its environment once, and use that map to share with others with extended information provided by the scene understanding techniques. This also enables maps to be generated from information coming from different ecosystems.

The maps can also be updated over time based on new images and information received from the XR devices. Rather than provide the full updated maps to the XR devices based on newly detected objects or changes in previously detected objects, the XR system can send object representations for the objects to the XR devices. The object representations can include, for example, an occupancy grid that represents the areas of the physical environment occupied by the object. In some implementations, the occupancy grid includes a three-dimensional grid and each cell of the grid can include a value that indicates whether the object occupies the area of the environment represented by the cell. The three-dimensional grid can encompass a bounding box that represents an overall area of the environment in which the object is located.

An XR device can use the object representation to update the map stored at the XR device, e.g., by labeling a mesh that represents the environment and/or showing the object within the map. This also enables the XR system or XR device to display other objects with reference to the detected object. For example, if the detected object is a table, the XR device can use the occupancy grid to determine the portions of the environment occupied by the top surface of the table and display an object on the surface of the table.

Techniques as described herein can be used together or separately with many types of devices and for many types of scenes, including wearable or portable devices with limited computational resources that provide an augmented or mixed reality scene. In some implementations, the techniques can be implemented by one or more services that form a portion of an XR system.

FIG. 1 is a sketch illustrating an example of a simplified augmented reality (AR) scene 100. The AR scene 100 is depicted in which a user of an AR technology sees a physical world park-like setting 156, featuring people, trees, buildings in the background, and a concrete platform 158. In addition to these items, the user of the AR technology also perceives that they "see" a robot statue 157 standing upon the physical world concrete platform 158, and a cartoon-like avatar character 152 flying by which seems to be a personification of a bumble bee, even though these elements, e.g., the avatar character 152, and the robot statue 157, do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that builds maps of the physical world based on tracking information, enable users to place AR content in the physical world, determine locations in the maps of the physical world where AR content are placed, preserve the AR scenes such that the placed AR content can be reloaded to display in the physical world during, for example, a different AR experience session, and enable multiple users to share an AR experience. The system may build and update a digital representation of the physical world surfaces around the user. This representation may be used to render virtual content so as to appear fully or partially occluded by physical objects between the user and the rendered location of the virtual content, to place virtual objects, in physics based interactions, and for virtual character path planning and navigation, or for other operations in which information about the physical world is used.

Figure 2:
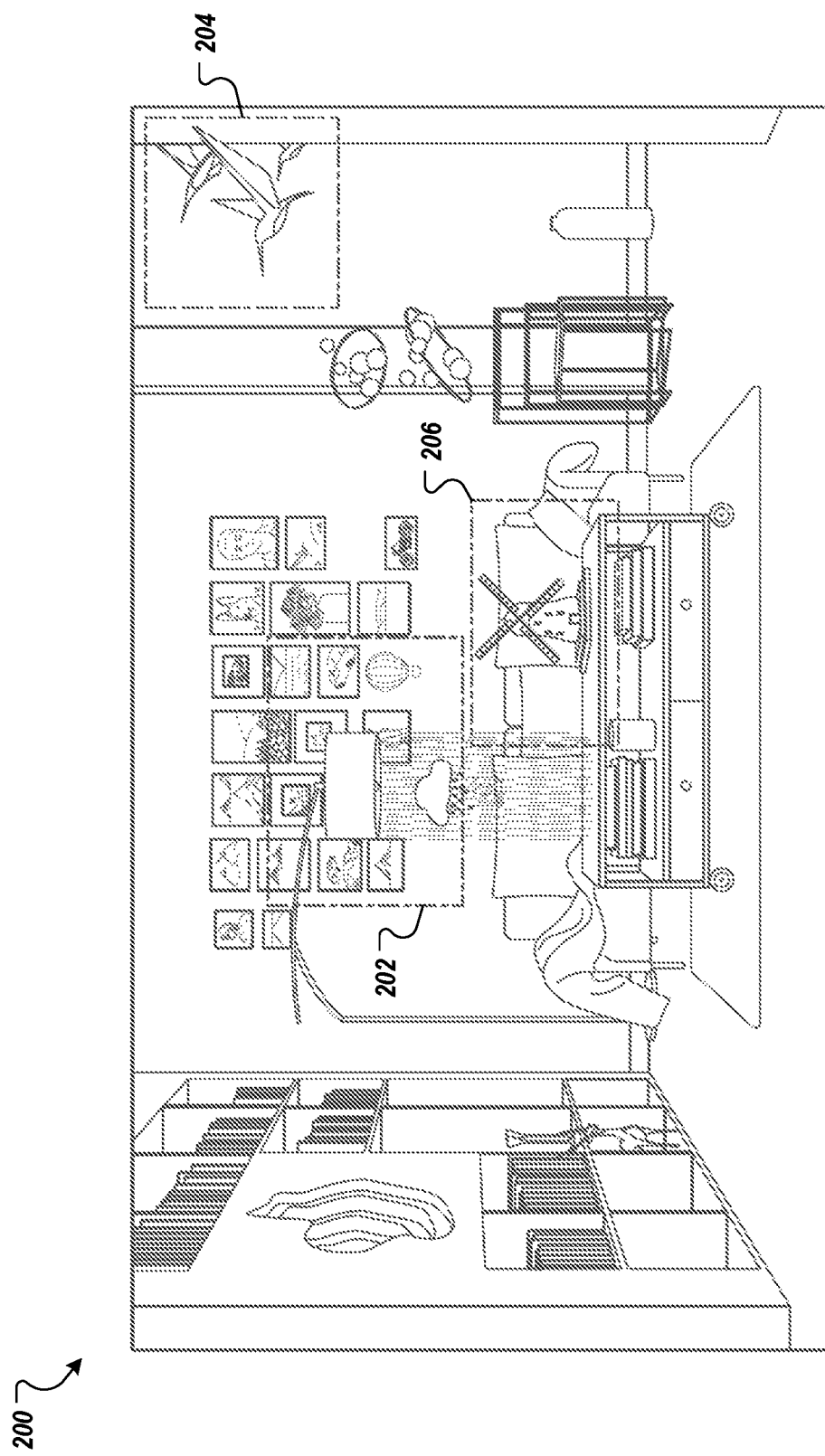
FIG. 2 is a sketch of an example simplified AR scene, showing exemplary use cases of an XR system.

FIG. 2 is a sketch of an example simplified AR scene 200, showing exemplary use cases of an XR system. The example scene 200 is a living room having walls, a bookshelf on one side of a wall, a floor lamp at a corner of the room, a floor, a sofa, and coffee table on the floor. In addition to these physical items, the user of the AR technology also perceives virtual objects such as images 202 on the wall behind the sofa, birds 204 flying through the door, a deer peeking out from the book shelf, and a decoration in the form of a windmill 206 placed on the coffee table.

For the images 202 on the wall, the AR technology requires information about not only surfaces of the wall but also objects and surfaces in the room such as lamp shape, which are occluding the images to render the virtual objects correctly. For the flying birds 204, the AR technology requires information about all the objects and surfaces around the room for rendering the birds 204 with realistic physics to avoid the objects and surfaces or bounce off them if the birds 204 collide. For the deer, the AR technology requires information about the surfaces such as the floor or coffee table to compute where to place the deer. For the windmill 206, the system can identify that is an object separate from the table and may determine that it is movable, whereas corners of shelves or corners of the wall may be determined to be stationary. Such a distinction may be used in determinations as to which portions of the scene are used or updated in each of various operations.

The virtual objects can be placed in a previous AR experience session. When new AR experience sessions start in the living room, the AR technology requires the virtual objects being accurately displayed at the locations previously placed and realistically visible from different viewpoints. For example, the windmill 206 should be displayed as standing on the books rather than drifting above the table at a different location without the books. Such drifting may happen if the locations of the users of the new AR experience sessions are not accurately localized in the living room. As another example, if a user is viewing the windmill 206 from a viewpoint different from the viewpoint when the windmill 206 was placed, the AR technology requires corresponding sides of the windmill 206 being displayed.

A scene may be presented to the user via a system that includes multiple components, including a user interface that can stimulate one or more user senses, such as sight, sound, and/or touch. In addition, the system may include one or more sensors that can measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some implementations, some or all of these components can be integrated into a wearable device.

Figure 3:
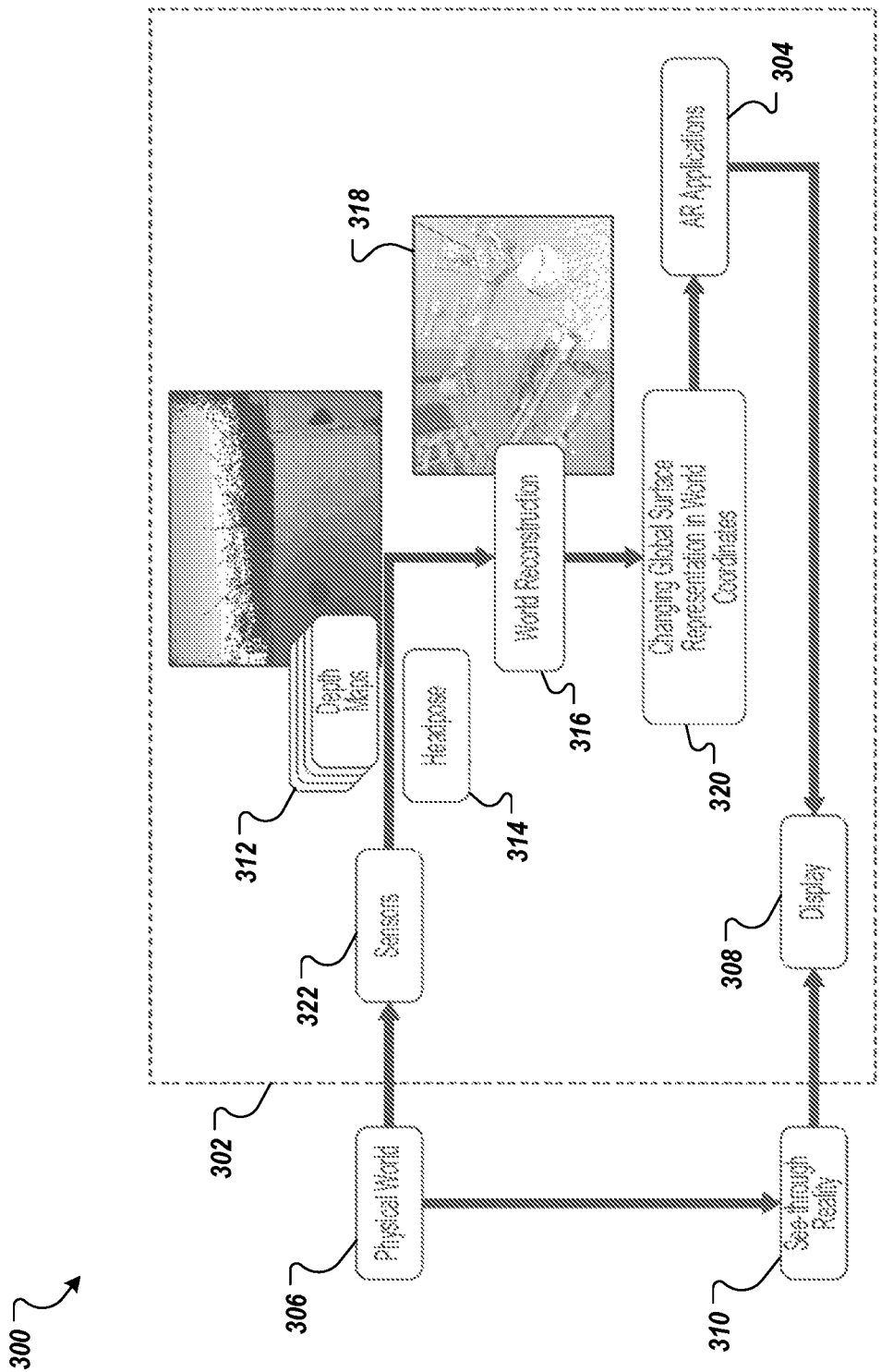
FIG. 3 shows an environment in which an AR system is configured to provide an experience of AR contents interacting with a physical world.

FIG. 3 shows an environment 300 in which an AR system 302 is configured to provide an experience of AR contents interacting with a physical world. The AR system 302 can include a display 308. In the illustrated example, the display 308 can be worn by the user as part of a headset such that a user may wear the display over their eyes like a pair of goggles or glasses. At least a portion of the display 308 may be transparent such that a user may observe a see-through reality 310. The see-through reality 310 can correspond to portions of the physical world 306 that are within a present viewpoint of the AR system 302, which may correspond to the viewpoint of the user in the case that the user is wearing a headset incorporating both the display and sensors of the AR system to acquire information about the physical world.

AR contents may also be presented on the display 308, overlaid on the see-through reality 310. To provide accurate interactions between AR contents and the see-through reality 310 on the display 308, the AR system 302 can include sensors 322 configured to capture information about the physical world 306.

The sensors 322 can include one or more depth sensors that output depth maps 312. Each depth map 312 can have multiple pixels, each of which may represent a distance to a surface in the physical world 306 in a particular direction relative to the depth sensor. Raw depth data may come from a depth sensor to create a depth map. Such depth maps may be updated as fast as the depth sensor can form a new image, which can be hundreds or thousands of times per second. However, that data may be noisy and incomplete, and have holes shown as black pixels on the illustrated depth map.

The system can include other sensors, such as image sensors. The image sensors may acquire monocular or stereoscopic information that can be processed to represent the physical world in other ways. For example, the images may be processed in world reconstruction component 316 to create a mesh, representing connected portions of objects in the physical world. Metadata about such objects, including for example, color and surface texture, can similarly be acquired with the sensors and stored as part of the world reconstruction.

The AR system 302 can also acquire information about the headpose (or "pose") of the user with respect to the physical world. In some implementations, a head pose tracking component of the AR system 302 can be used to compute headposes in real time. The head pose tracking component can represent a headpose of a user in a coordinate frame with six degrees of freedom including, for example, translation in three perpendicular axes (e.g., forward/backward, up/down, left/right) and rotation about the three perpendicular axes (e.g., pitch, yaw, and roll). In some implementations, the sensors 322 can include inertial measurement units ("IMUs") that can be used to compute and/or determine a headpose 314. A headpose 314 for a depth map can indicate a present viewpoint of a sensor capturing the depth map with six degrees of freedom, for example, but the headpose 314 may be used for other purposes, such as to relate image information to a particular portion of the physical world or to relate the position of the display worn on the user's head to the physical world.

In some implementations, the headpose information can be derived in other ways than from an IMU, such as from analyzing objects in an image. For example, the head pose tracking component can compute relative position and orientation of an AR device to physical objects based on visual information captured by cameras and inertial information captured by IMUs. The head pose tracking component may then compute a headpose of the AR device by, for example, comparing the computed relative position and orientation of the AR device to the physical objects with features of the physical objects. In some implementations, that comparison can be made by identifying features in images captured with one or more of the sensors 322 that are stable over time such that changes of the position of these features in images captured over time can be associated with a change in headpose of the user.

In some implementations, the AR device can construct a map from the feature points recognized in successive images in a series of image frames captured as a user moves throughout the physical world with the AR device. Though each image frame can be taken from a different pose as the user moves, the system can adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, can be used to determine the user's pose within the physical world by matching features from current image frames to the map.

In addition to enabling tracking of the user's pose within the environment, this map can enable other components of the AR system 302, such as the world reconstruction component 316, to determine the location of physical objects with respect to the user. The world reconstruction component 316 can receive the depth maps 312 and headposes 314, and any other data from the sensors 322, and integrate that data into a reconstruction 318. The reconstruction 318 can be more complete and less noisy than the sensor data. The world reconstruction component 316 can update the reconstruction 318 using spatial and temporal averaging of the sensor data from multiple viewpoints over time.

The reconstruction 318 can include representations of the physical world in one or more data formats including, for example, voxels, meshes, planes, etc. The different formats can represent alternative representations of the same portions of the physical world or can represent different portions of the physical world. In the illustrated example, on the left side of the reconstruction 318, portions of the physical world are presented as a global surface; on the right side of the reconstruction 318, portions of the physical world are presented as meshes.

The AR system 302 can integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world can be fused together into a single, combined reconstruction of the physical world, which may serve as an abstract layer for the map and provide spatial information. The reconstruction can be more complete and less noisy than the original sensor data by using spatial and temporal averaging (i.e. averaging data from multiple viewpoints over time), or any other suitable method.

In the illustrated example of FIG. 3, a map represents the portion of the physical world in which a user of a single, wearable device is present. In that scenario, headpose associated with frames in the map may be represented as a local headpose, indicating orientation relative to an initial orientation for a single device at the start of a session. For example, the headpose may be tracked relative to an initial headpose when the device was turned on or otherwise operated to scan an environment to build a representation of that environment.

In combination with content characterizing that portion of the physical world, the map can include metadata. The metadata, for example, can indicate the time of capture of the sensor information used to form the map. Metadata alternatively or additionally can indicate location of the sensors at the time of capture of information used to form the map. Location may be expressed directly, such as with information from a GPS chip, or indirectly, such as with a wireless (e.g. Wi-Fi) signature indicating strength of signals received from one or more wireless access points while the sensor data was being collected and/or with identifiers, such as BSSIDs, of wireless access points to which the user device connected while the sensor data was collected.

The reconstruction 318 can be used for AR functions, such as producing a surface representation of the physical world for occlusion processing or physics-based processing. This surface representation can change as the user moves or objects in the physical world change. Aspects of the reconstruction 318 can be used, for example, by a component 320 that produces a changing global surface representation in world coordinates, which may be used by other components.

The AR content can be generated based on this information, such as by AR applications 304. An AR application 304 can be a game program, for example, that performs one or more functions based on information about the physical world, such as visual occlusion, physics-based interactions, and environment reasoning. The AR application 304 can perform these functions by querying data in different formats from the reconstruction 318 produced by the world reconstruction component 316. In some implementations, component 320 can be configured to output updates when a representation in a region of interest of the physical world changes. That region of interest, for example, can be set to approximate a portion of the physical world in the vicinity of the user of the system, such as the portion within the view field of the user, or is projected (predicted/determined) to come within the view field of the user.

The AR applications 304 can use this information to generate and update the AR contents. The virtual portion of the AR contents may be presented on the display 308 in combination with the see-through reality 310, creating a realistic user experience.

In some implementations, an AR experience may be provided to a user through an XR device, which may be a wearable display device, which can be part of a system that may include remote processing and or remote data storage and/or, in some implementations, other wearable display devices worn by other users. For example, the world reconstruction 316 or portions thereof can be implemented in a cloud-based system remote from the user's XR devices.

Figure 4:
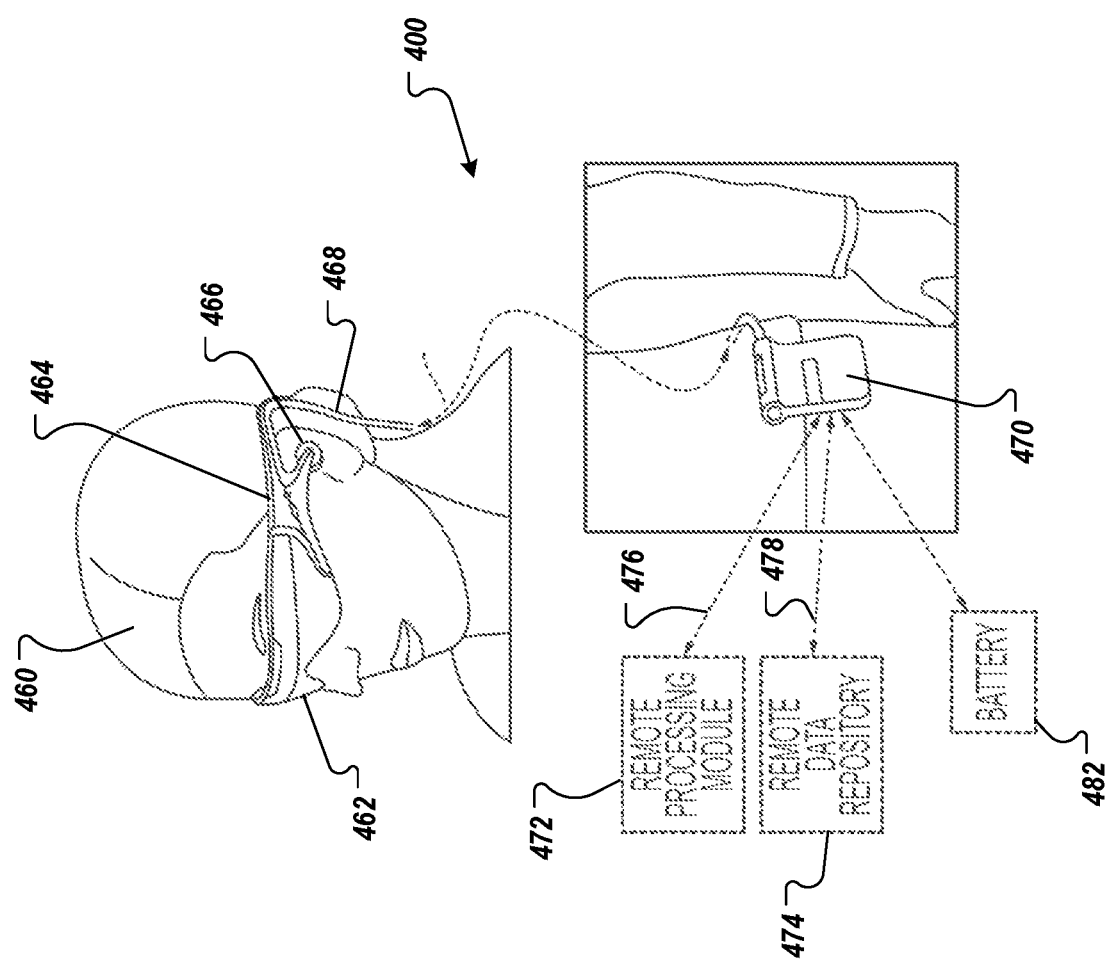
FIG. 4 shows an example AR display system, displaying virtual content for a user.

FIG. 4 shows an example AR display system 400, displaying virtual content for a user. The system 400 includes a head mounted display device 462 (hereinafter referred to as "display device 462"), and various mechanical and electronic modules and systems to support the functioning of the display device 462. The display device 462 can be coupled to a frame 464, which is wearable by a display system user or viewer 460 (hereinafter referred to as "user 460") and configured to position the display device 462 in front of the eyes of the user 460. According to various implementations, the display device 462 can be a sequential display. The display device 462 can be monocular or binocular. In some implementations, the display device 462 can be an example of the display 308 in FIG. 3.

In some implementations, a speaker 466 is coupled to the frame 464 and positioned proximate an ear canal of the user 460. In some implementations, another speaker, not shown, is positioned adjacent another ear canal of the user 460 to provide for stereo/shapeable sound control. The display device 462 is operatively coupled, such as by a wired lead or wireless connectivity 468, to a local data processing module 470 which can be mounted in a variety of configurations, such as fixedly attached to the frame 464, fixedly attached to a helmet or hat worn by the user 560, embedded in headphones, or otherwise removably attached to the user 460 (e.g., in a backpack-style configuration, in a belt-coupling style configuration).

The local data processing module 470 can include a processor, as well as digital memory, such as non-volatile memory, e.g., flash memory, both of which may be utilized to assist in the processing, caching, and storage of data. The data include data a) captured from sensors (which may be, e.g., operatively coupled to the frame 464) or otherwise attached to the user 460, such as image capture devices (such as cameras), microphones, inertial measurement units, accelerometers, compasses, GPS units, radio devices, and/or gyros; and/or b) acquired and/or processed using remote processing module 472 and/or remote data repository 474, possibly for passage to the display device 462 after such processing or retrieval.

In some implementations, the wearable deice can communicate with remote components. The local data processing module 470 can be operatively coupled by communication links 476, 478, such as via a wired or wireless communication links, to the remote processing module 472 and remote data repository 474, respectively, such that these remote modules 472, 474 are operatively coupled to each other and available as resources to the local data processing module 470. In further implementations, in addition or as alternative to remote data repository 474, the wearable device can access cloud based remote data repositories, and/or services. In some implementations, the head pose tracking component described above can be at least partially implemented in the local data processing module 470. In some implementations, the world reconstruction component 416 in FIG. 3 can be at least partially implemented in the local data processing module 470. For example, the local data processing module 470 can be configured to execute computer executable instructions to generate the map and/or the physical world representations based at least in part on at least a portion of the data.

In some implementations, the local data processing module 470 can include one or more processors (e.g., a graphics processing unit (GPU)) configured to analyze and process data and/or image information. In some implementations, the local data processing module 470 can include a single processor (e.g., a single-core or multi-core ARM processor), which would limit the local data processing module's compute budget but enable a more miniature device. In some implementations, the world reconstruction component 416 can use a compute budget less than a single Advanced RISC Machine (ARM) core to generate physical world representations in real-time on a non-predefined space such that the remaining compute budget of the single ARM core can be accessed for other uses such as, for example, extracting meshes.

In some implementations, the remote data repository 474 can include a digital data storage facility, which may be available through the Internet or other networking configuration in a "cloud" resource configuration. In some implementations, all data is stored and all computations are performed in the local data processing module 470, allowing fully autonomous use from a remote module. In some implementations, all data is stored and all or most computations are performed in the remote data repository 474, allowing for a smaller device. A world reconstruction, for example, can be stored in whole or in part in this repository 474.

In some implementations, a world reconstruction is stored in the local data processing module 470. The local data processing module 470 can receive information related to objects located in a physical world and update the locally stored world reconstruction. The information for an object can include information describing the location of the object in the physical world and the areas of the physical world occupied by the object. For example, the information for an object can include an object representation that includes bounding box information for the object and an occupancy grid for the object.

In some implementations, the local data processing module 470 is operatively coupled to a battery 482. In some implementations, the battery 482 is a removable power source, such as over the counter batteries. In other implementations, the battery 482 is a lithium-ion battery. In some implementations, the battery 482 includes both an internal lithium-ion battery chargeable by the user 460 during non-operation times of the system 480 and removable batteries such that the user 460 may operate the system 480 for longer periods of time without having to be tethered to a power source to charge the lithium-ion battery or having to shut the system 480 off to replace batteries.

Figure 5A:
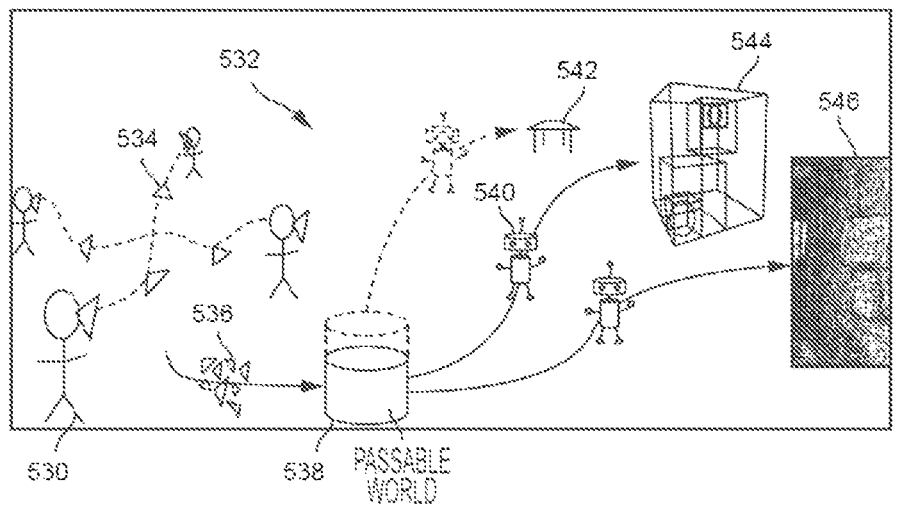
FIG. 5A shows a user wearing an AR display system rendering AR content as the user moves through a physical world environment.

FIG. 5A shows a user 530 wearing an AR display system rendering AR content as the user 430 moves through a physical world environment 532 (hereinafter referred to as "environment 532"). The information captured by the AR system along the movement path of the user may be processed into one or more tracking maps. The user 530 positions the AR display system at positions 534, and the AR display system records ambient information of a passable world, e.g., a digital representation of the real objects in the physical world that can be stored and updated with changes to the real objects in the physical world, relative to the positions 534. That information can be stored as poses in combination with images, features, directional audio inputs, or other desired data. The positions 534 are aggregated to data inputs 536 and processed at least by a passable world module 538, which may be implemented, for example, by processing on a remote processing module 572 of FIG. 4. In some implementations, the passable world module 538 can include the head pose component 514 and the world reconstruction component 516, such that the processed information may indicate the location of objects in the physical world in combination with other information about physical objects used in rendering virtual content.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some implementations, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content can be positioned such that it appears to be on that table. In some implementations, the AR content can be placed within structures in a field of view 544, which may be a present field of view or an estimated future field of view. In some implementations, the AR content can be persisted relative to a model 546 of the physical world (e.g., a mesh).

As depicted, the fixed element 542 serves as a proxy (e.g., digital copy) for any fixed element within the physical world which may be stored in the passable world module 538 so that the user 530 can perceive content on the fixed element 542 without the system having to map to the fixed element 542 each time the user 530 sees it. The fixed element 542 can, therefore, be a mesh model from a previous modeling session or determined from a separate user but nonetheless stored by the passable world module 538 for future reference by a plurality of users. Therefore, the passable world module 538 can recognize the environment 532 from a previously mapped environment and display AR content without a device of the user 530 mapping all or part of the environment 532 first, saving computation process and cycles and avoiding latency of any rendered AR content.

The mesh model 546 of the physical world can be created by the AR display system and appropriate surfaces and metrics for interacting and displaying the AR content 540 can be stored by the passable world module 538 for future retrieval by the user 530 or other users without the need to completely or partially recreate the model. In some implementations, the data inputs 536 are inputs such as geo-location, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in implementations in which objects are considered to be fixed (e.g., a kitchen table), the passable world module 538 can update those objects in a model of the physical world from time to time to account for the possibility of changes in the physical world. The model of fixed objects can be updated with a very low frequency. Other objects in the physical world may be moving or otherwise not regarded as fixed (e.g. kitchen chairs). To render an AR scene with a realistic feel, the AR system can update the position of these non-fixed objects with a much higher frequency than is used to update fixed objects. To enable accurate tracking of all of the objects in the physical world, an AR system can draw information from multiple sensors, including one or more image sensors. As described in more detail below, the AR system can update the model of the objects based on received object representations that include an occupancy grid for each object.

Figure 5B:
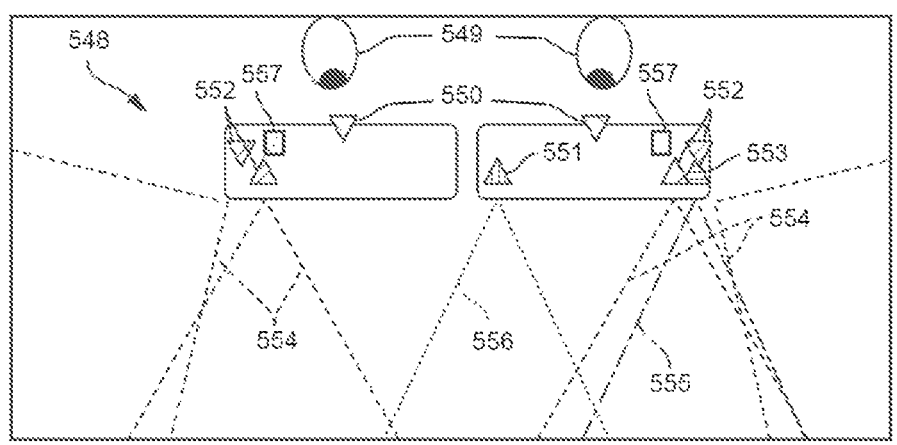
FIG. 5B shows a viewing optics assembly and attendant components.

FIG. 5B shows a viewing optics assembly 548 and attendant components. In some implementations, two eye tracking cameras 550, directed toward user eyes 549, detect metrics of the user eyes 549, such as eye shape, eyelid occlusion, pupil direction and glint on the user eyes 549.

In some implementations, one of the sensors may be a depth sensor 551, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some implementations, world cameras 552 record a greater-than-peripheral view to map and/or otherwise create a model of the environment 532 and detect inputs that may affect AR content. In some implementations, the world camera 552 and/or camera 553 may be grayscale and/or color image sensors, which can output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532.

Inertial measurement units 557 can determine movement and orientation of the viewing optics assembly 548. In some implementations, each component is operatively coupled to at least one other component. For example, the depth sensor 551 is operatively coupled to the eye tracking cameras 550 as a confirmation of measured accommodation against actual distance the user eyes 549 are looking at.

In some implementations, a viewing optics assembly 548 can include two world cameras 552 instead of four. Alternatively or additionally, cameras 552 and 553 need not capture a visible light image of their full field of view. A viewing optics assembly 548 can include other types of components. In some implementations, a viewing optics assembly 548 can include one or more dynamic vision sensor (DVS), whose pixels may respond asynchronously to relative changes in light intensity exceeding a threshold.

In some implementations, a viewing optics assembly 548 may not include the depth sensor 551 based on time of flight information. In some implementations, for example, a viewing optics assembly 548 can include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 5B is provided as an example. A viewing optics assembly 548 can include components with any suitable configuration, which can be set to provide the user with the largest field of view practical for a particular set of components. For example, if a viewing optics assembly 548 has one world camera 552, the world camera can be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other examples, physical and virtual content can be depicted in one scene by modulating the opacity of a display device that a user looks through at the physical world. The opacity can be controlled so as to create the appearance of the virtual object and also to block the user from seeing objects in the physical world that are occluded by the virtual objects. In some implementations, the image data may only include virtual content that may be modified such that the virtual content is perceived by a user as realistically interacting with the physical world (e.g., clip content to account for occlusions), when viewed through the user interface.

The location on the viewing optics assembly 548 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 548 to create a desired appearance for the user.

Regardless of how content is presented to a user, a model of the physical world can be used so that characteristics of the virtual objects, which can be impacted by physical objects, including the shape, position, motion, and visibility of the virtual object, can be correctly computed. In some implementations, the model can include the reconstruction of a physical world, for example, the reconstruction 518.

That model may be created from data collected from sensors on a wearable device of the user. Though, in some implementations, the model can be created from data collected by multiple users, which can be aggregated in a computing device remote from all of the users (and which may be "in the cloud"). The model may be created, at least in part, by a world reconstruction system such as, for example, the world reconstruction component 516 of FIG. 3.

Figure 6A:
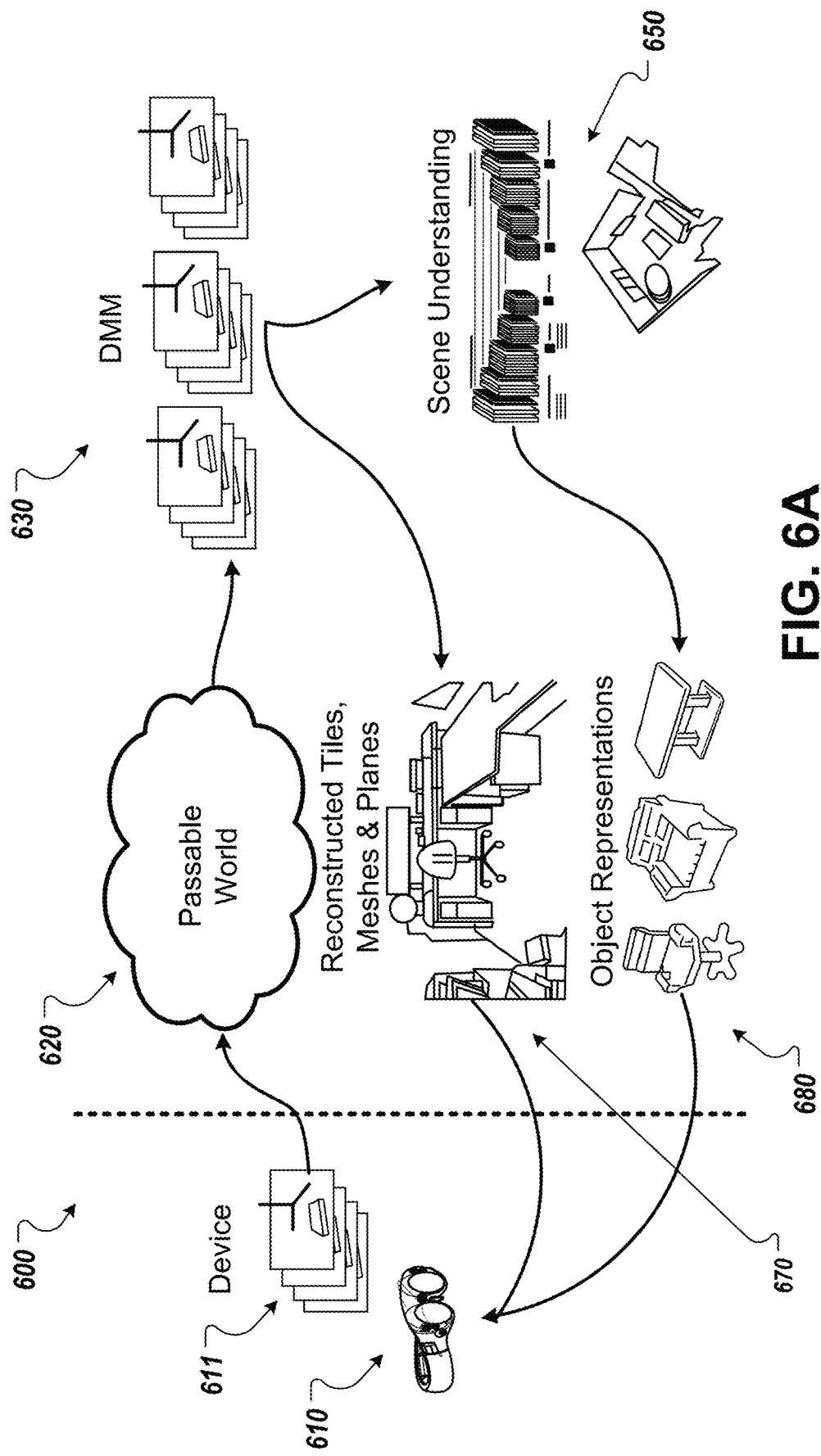
FIG. 6A shows an example pipeline for reconstructing an environment.

FIG. 6A shows an example pipeline 600 for generating a reconstruction of an environment. The reconstruction can include representations of the physical world in one or more data formats including, for example, voxels, meshes, planes, etc.

A passable world module 620, which can be the same or similar to the passable world module 538 of FIG. 5A, collects data 611 from multiple devices 610. The passable world module 620 can be implemented by one or more remote servers, e.g., in a cloud-based environment, remote from the devices 610.

The devices can include user devices, e.g., wearable XR devices worn by users. The data can include, for example, depth images (e.g., depth maps 312) and optionally color images. The data can also include, for each image, pose (e.g., headpose) and location information for the device 610 at the time that the device 610 captured the image. This information provides the orientation and location of the device 610 at the time the image was captured.

Although shown as a separate component, the passable world module 620 can include a deep map merge (DMM) engine 630 and a scene understanding engine 650. The passable world module 620 can aggregate the images and other data received from the multiple devices 610 and pass the data to the DMM engine 630.

In general, the DMM engine 630 merges the maps represented by the images and reconstructs a map of the physical world. In reconstructing the map, the DMM engine 630 generates various types of data 670 to represent the map. As described in more detail with reference to FIG. 6B, this data 670 includes a description of objects detected/recognized in the images, tiles that represent the physical world depicted by the images, meshes of the physical world, and planes of the physical world.

The scene understanding engine 650 can enrich the data generated by the DMM engine 630 with additional data related to the objects in the physical world. For example, the scene understanding engine 650 can recognize the objects, e.g., using object recognition techniques, and generate labels for the objects. The labels can indicate, for example, the type of the object and/or the identity of the object. The scene understanding engine 650 can include the label in the map and the reconstruction that is presented to the user(s). The scene understanding engine 650 can also generate additional information about the objects, such as abstracting/generating representations of the objects 680 and generating occupancy grids that represent the areas of the environment occupied by the objects. The occupancy grids can be used by the devices 611 to display the object in the appropriate location and orientation in the reconstruction, and to attach AR content to the objects.

Figure 6B:
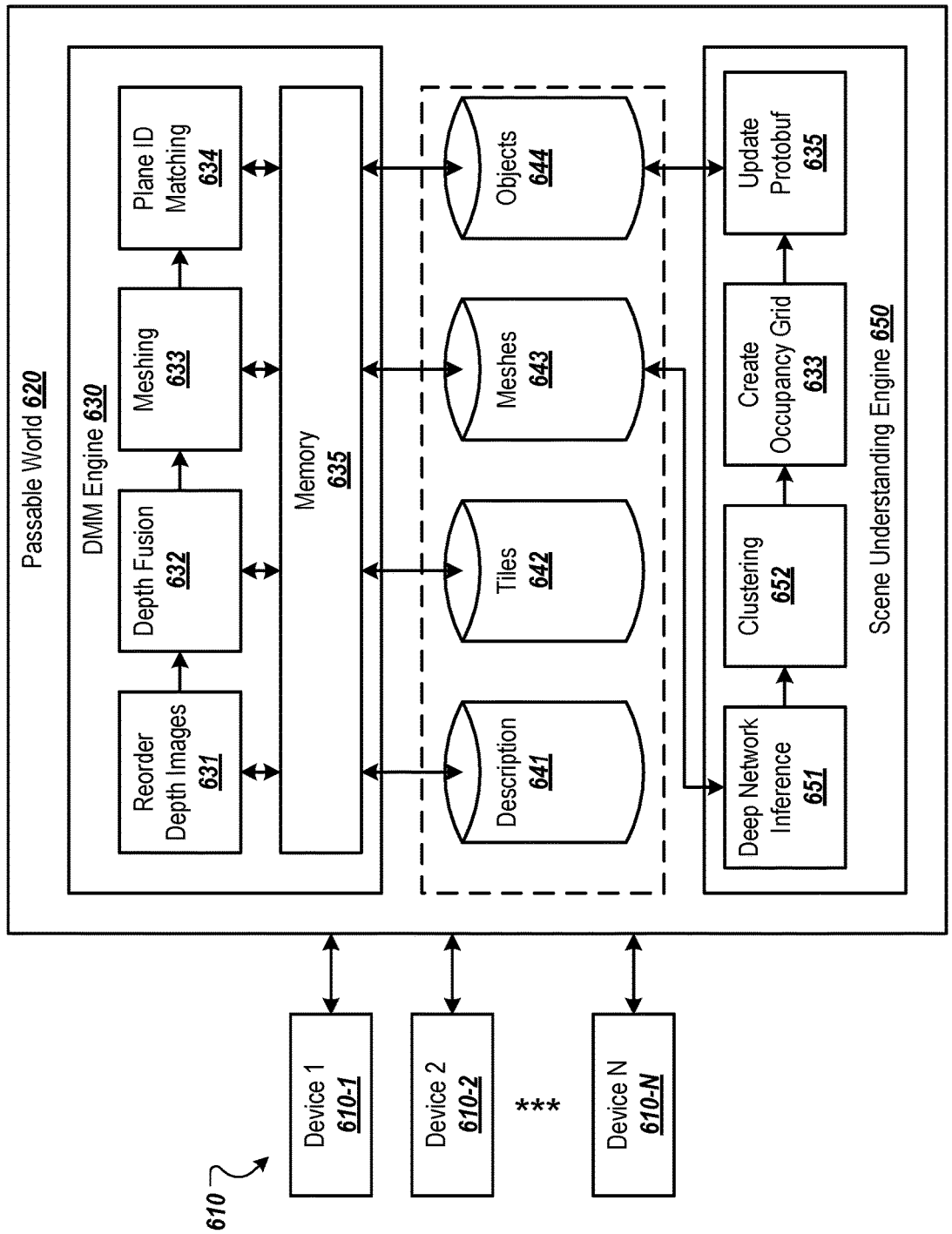
FIG. 6B shows components of the example pipeline in more detail.

FIG. 6B shows components of the example pipeline 600 in more detail. As shown in FIG. 6B, multiple devices 610 provide data to the passable world module 620, which includes the DMM engine 630 and the scene understanding engine 650.

The DMM engine 630 can perform several map merge functions to reconstruct a map of the physical world using the data received from the devices 610. In particular, the DMM engine 630 can reorder the depth images 631 received from the devices 610. For example, the DMM engine 630 can reorder the images based on location and/or pose to that images of the same or adjacent areas are near each other in the new order.

The DMM engine 630 can the perform depth fusion operations 632 to fuse the images to generate a single, combined reconstruction of the physical world. The DMM engine 630 can fuse the images using the pose information received for each of the images. The DMM engine 630 can fuse the images together and create a volumetric representation of the physical world depicted by the images. The volumetric representation can be in the form of voxels. Each voxel may correspond to a three-dimensional cube of a predetermined volume in the physical world, and include surface information, indicating whether there is a surface in the volume represented by the voxel.

The DMM engine 630 can also perform meshing operations 633 to generate a mesh that represents the physical world depicted by the images. The mesh is a three-dimensional model that represents connected portions of objects in the physical world. The mesh can include vertices, edges, and faces that correspond to the physical surfaces of the environment and objects of the physical world.

The DMM engine 630 can also perform plane ID matching operations 634 to identify the planes in the physical world as depicted by the images, assign an identifier ("ID") to the planes, and match planes from images with the corresponding planes in other images.

The DMM engine 630 stores the voxel representation, the mesh, and information about the planes in memory 635, which can be implemented as Random Access Memory (RAM). The DMM engine 630 can also segment the map or its voxel representation into multiple smaller tiles and store the tiles in memory 635. The DMM engine 635 stores, in the memory, a description 641 of each object detected in the images received from the devices 610, the tiles 642, and the meshes 643. The DMM engine 630 can also maintain an objects database 644 that includes information about the objects and information about the planes, e.g., the plane IDs. This database 644 can be used to query the planes or objects.

The scene understanding engine 650 performs deep network inference to recognize the objects in the meshes 643. The scene understanding engine 650 can use a trained machine learning model, e.g., a trained deep neural network model, to recognize the objects in the meshes. For each recognized object, the scene understanding engine 650 can assign a semantic label to each voxel that includes a portion of the object. For example, if a set of voxels include a chair, each voxel in the set can be assigned the label "chair." In some implementations, the scene understanding engine 650 uses a three-dimensional semantic segmentation network to generate per-voxel semantic labels.

The scene understanding engine 650 can perform clustering operations 652 to generate clusters of voxels. Each cluster can represent a common object recognized in the meshes 643. If there are multiple objects of the same type, the scene understanding engine 650 can generate an individual cluster for each instance of the type of object. In some implementations, the scene understanding engine 650 clusters the semantic labels together to form an object sing a DBScan algorithm.

The scene understanding engine 650 creates an occupancy grid for each object, e.g., each object corresponding to a cluster of voxels. An occupancy grid can represent the areas of the environment occupied by the object. In some implementations, the occupancy grid includes a three-dimensional grid and each cell of the grid can include a value that indicates whether the object occupies the area of the environment represented by the cell. The three-dimensional grid can encompass a bounding box that represents an overall area of the environment in which the object is located.

To generate the occupancy grid, the scene understanding engine 650 can generate, e.g., fit, or obtain a bounding box for the object. For example, the scene understanding engine 650 can fit a minimum oriented bounding box around the object to represent the object's geometric position within a mesh. The scene understanding engine 650 can then segment the bounding box into a three-dimensional grid of cells. The scene understanding engine 650 can then evaluate each cell of the grid to determine whether any portion of the object is found within the cell. The scene understanding engine 650 can assign a value to each cell based on whether the cell includes a portion or the object. For example, of the cell includes a portion of the object, the scene understanding engine 650 can assign a value of one to the cell. If the cell is not occupied by any portion of the object, the scene understanding engine 650 can assign a different value to the cell, e.g., a value of zero.

Figure 8:
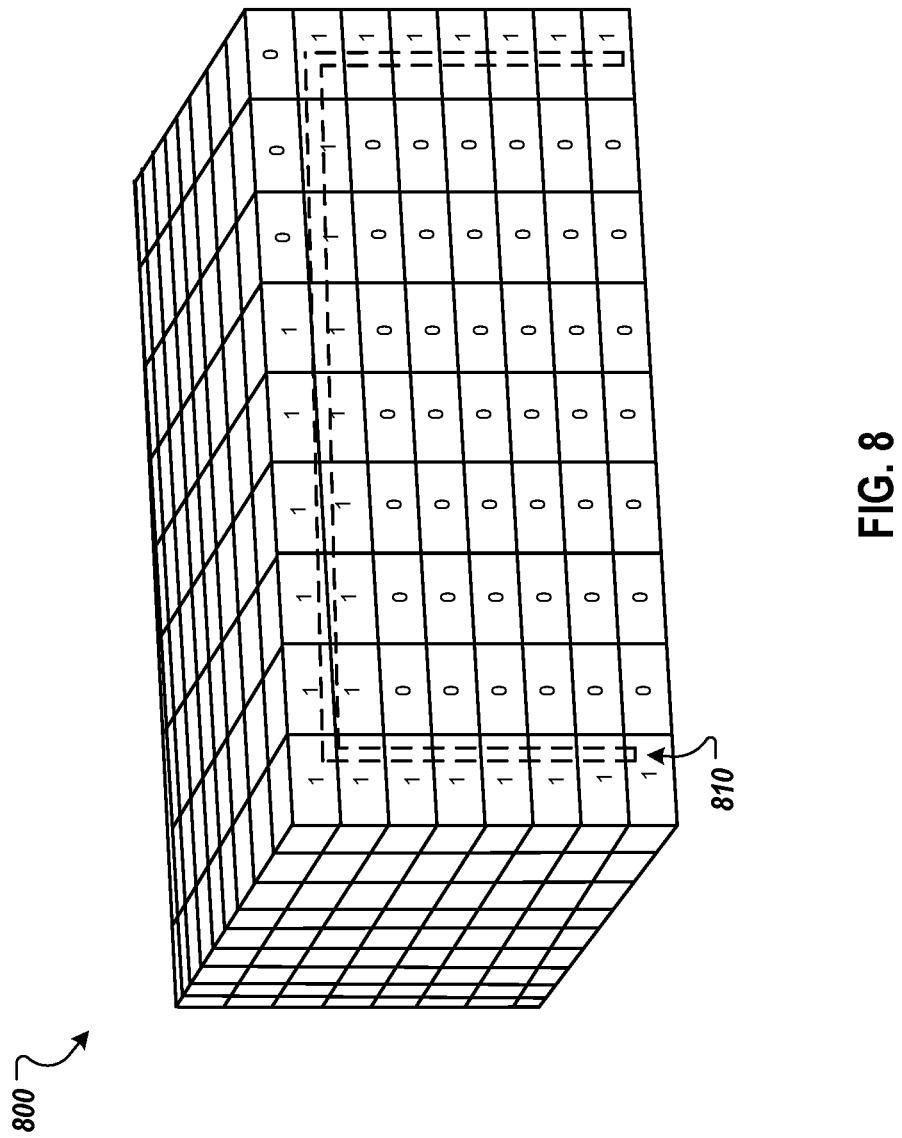
FIG. 8 shows an example occupancy grid.

FIG. 8 shows an example occupancy grid 800. The example occupancy grid represents an area of a physical world occupied by a table 810. The occupancy grid 800 is sized and shaped based on a bounding box generated to encompass the table 810. As shown in FIG. 8, each cell that includes a portion of the table 810 has a value of one and each cell that does not include a portion of the table 810 has a value of zero. For clarity, FIG. 8 only shows the values for the cells on one side of the occupancy grid 800.

Referring back to FIG. 6B, the scene understanding engine 650 updates 635 a protocol buffer (protobuf) with the occupancy grid and other information about the detected objects, e.g., the label that identifies the type of the object, bounding box information, etc. The data is then moved to the database 644.

In some implementations, the scene understanding engine 650 creates an object representation for each object and updates the protobuf with each object representation. An object representation can include data about the object. For example, an object representation for an object can include a map identifier, e.g., a sparse map identifier, that identifies the map and optionally the version of the map where the object is located. The object representation for an object can include a unique object identifier for the object. The map identifier and the object identifier can be Coordinate Frame Unique IDs (CFUIDs), which are globally unique identifiers across multiple or all devices 610 for representing map and persistent pose identifiers.

The object representation for an object can include a semantic label identifier. The semantic label identifier can indicate the type, or other semantic representation, of the object. For example, if the object representation is for a chair in a room, the semantic label identifier can be "chair."

The object representation for an object can include bounding box information for the bounding box that represents the location of the object in a map or mesh. The bounding box information can include the coordinates, e.g., x, y, z coordinates, of the center of the bounding box. The bounding box information can also include information indicating the distance that the bounding box extends in each direction from the center, e.g., extend x, extend y, and extend z. The bounding box information can also include information indicating the pose of the object within the bounding box.

The object representation for an object can include occupancy grid information. The occupancy grid information can include information indicating the location of each cell of the grid and, for each cell, a value that indicates whether a portion of the object is in the cell.

The object representations can be sent to the devices 610 so that the objects can be displayed accurately in the reconstructions displayed to the users. If an object changes, e.g., the location or pose of the object changes, this change can be detected in images received from the devices 610. As part of the pipeline 600, the scene understanding engine 650 will generate a new or updated object representation for the object and send the object representation to the devices 610.

By providing the object representations rather than the meshes, the reconstructions can be updated at the devices 610 with reduced latency and without occupying as much data storage as the meshes would otherwise occupy. The occupancy grid provides advantages over using updated meshes, e.g., the data storage, latency, and bandwidth advantages, as well as advantages over bounding boxes. Bounding boxes by themselves do not provide enough description of the object's geometries. Instead, a bounding box only indicates the location and orientation of the object. Using occupancy grids, the devices 610 and/or passable world module 620 can identify planes and meshes of the objects to place AR contents.

Using occupancy grids also enables the devices 610 to label planes and meshes at the devices 610 at query time without the added latency of using meshes. This ensures the consistency of object information with respect to smaller changes of mesh and planes.

Figure 7:
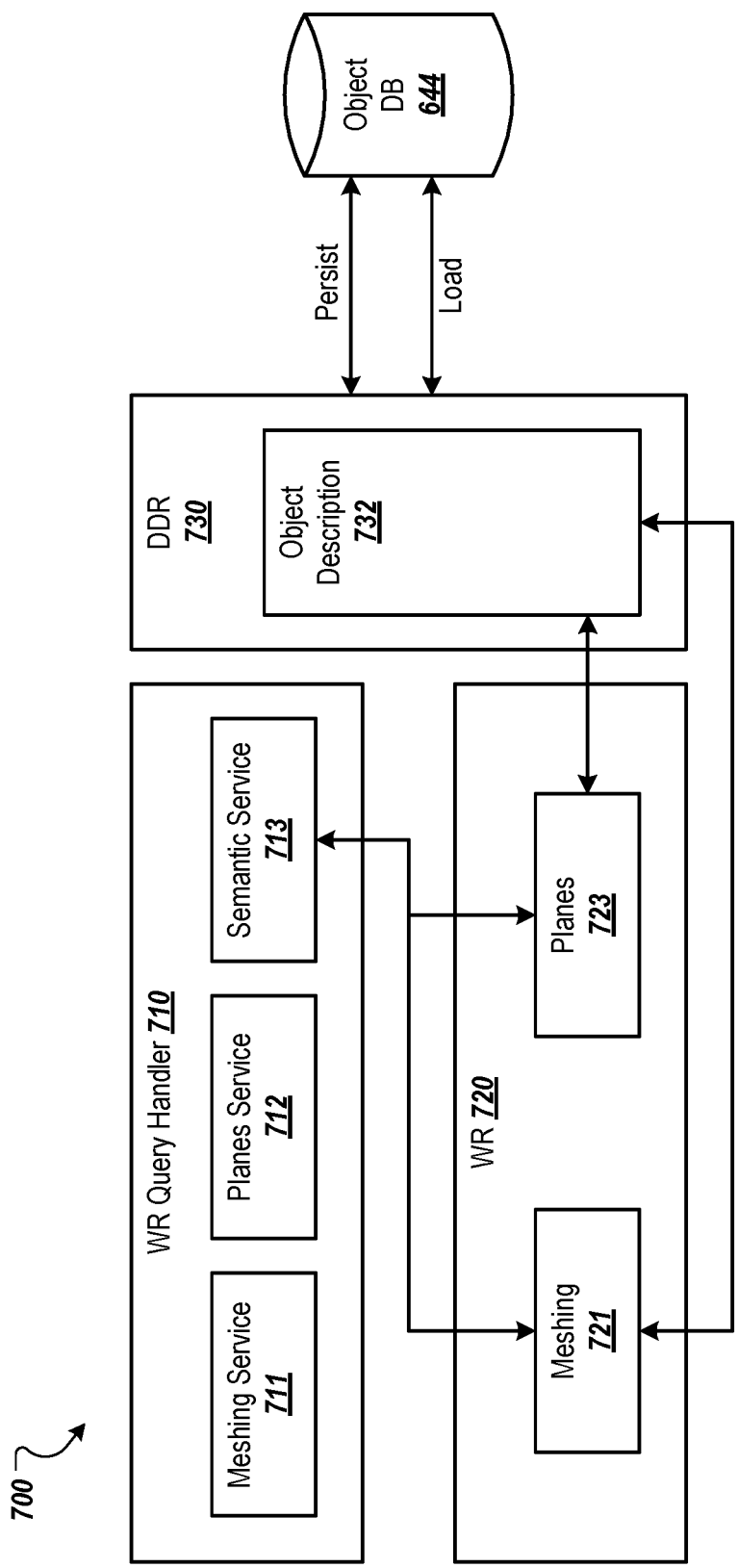
FIG. 7 shows components of an example AR display system.

FIG. 7 shows components of an example AR display system 700. The AR display system 700 can include the same or similar components as the AR display system 400. The AR display system 700 can also include a world reconstruction (WR) query handler 710, a WR engine 720, and object descriptions 732 stored in memory, e.g., in Double Data Rate Synchronous Dynamic Random-Access Memory (DDR SDRAM) memory 730, as shown in FIG. 7.

The object descriptions can include the object representations generated by the scene understanding engine 650 of FIGS. 6A and 6B. For example, the passable world module 620 can send the object representations from the object database to the AR display system 700, as one of the devices 610.

The WR query handler 710 can receive queries from an application, e.g., an AR application, generate responses to the queries, and send the responses to the requesting application. Queries can be used to obtain information about the physical world represented by the maps, e.g., from a particular point of view. In response to a query, the WR query handler 710 can send representations for the physical world in one or more formats. For example, when the query indicates that the use is for visual occlusion or physics-based interactions, the WR query handlers can send a representation of surfaces. When the query indicates that the use is for environmental reasoning, the WR query handler 710 can send meshes, planes and semantics of the physical world.

The WR query handler 710 can include individual query handlers that handle particular types of queries. For example, the WR query handler 710 includes a meshing service 711 that can identify a mesh that is responsive to a query and provide the mesh to the requesting application. The WR query handler 710 includes a planes service 712 that can identify a plane that is responsive to a query and provide the plane to the requesting application. The WR query handler 710 also includes a semantic service 713 that can identify an object that is responsive to a query and provide the mesh that includes the object, or information about the object, to the requesting application.

The WR engine 720 includes meshing information 721 and planes information 723. The WR engine 720 can reconstruct the meshes and planes using the meshing information 721 and the planes information 723. For example, the WR engine 720 can generate a reconstruction of the physical word for display by a display of the AR display system 700. The WR engine 720 can use the object information, e.g., the object representations, to label the meshes and planes with the labels for the objects.

The WR engine 720 can also use this information to place AR contents on the objects. For example, the WR engine 720 can use the information to identify the top surface of a table and place AR content, e.g., a virtual lamp, on the surface of the table. In a particular example, the WR engine 720 can identify the cells of the occupancy grid that include portions of the top surface of the table, e.g., based on the cells that include a portion of the table and the orientation of those cells. The WR engine 720 can then place a bottom of the virtual lamp within the mesh just above the identified cells for the top of the table.

The WR engine 720 can use the occupancy grids for the objects to label planes. For each of the planes extracted, the WR engine 720 can search through the objects database 644 and filter out objects with bounding boxes that have overlapping areas with the planes and keep them as candidates. For the candidates of each plane, the WR engine 720 can use the vertices on the planes to check their occupancy grid and calculate how many vertices are intersecting with the occupancy grid. This ratio represents whether the plane can be matched with the occupancy grid from an object.

Figure 9:
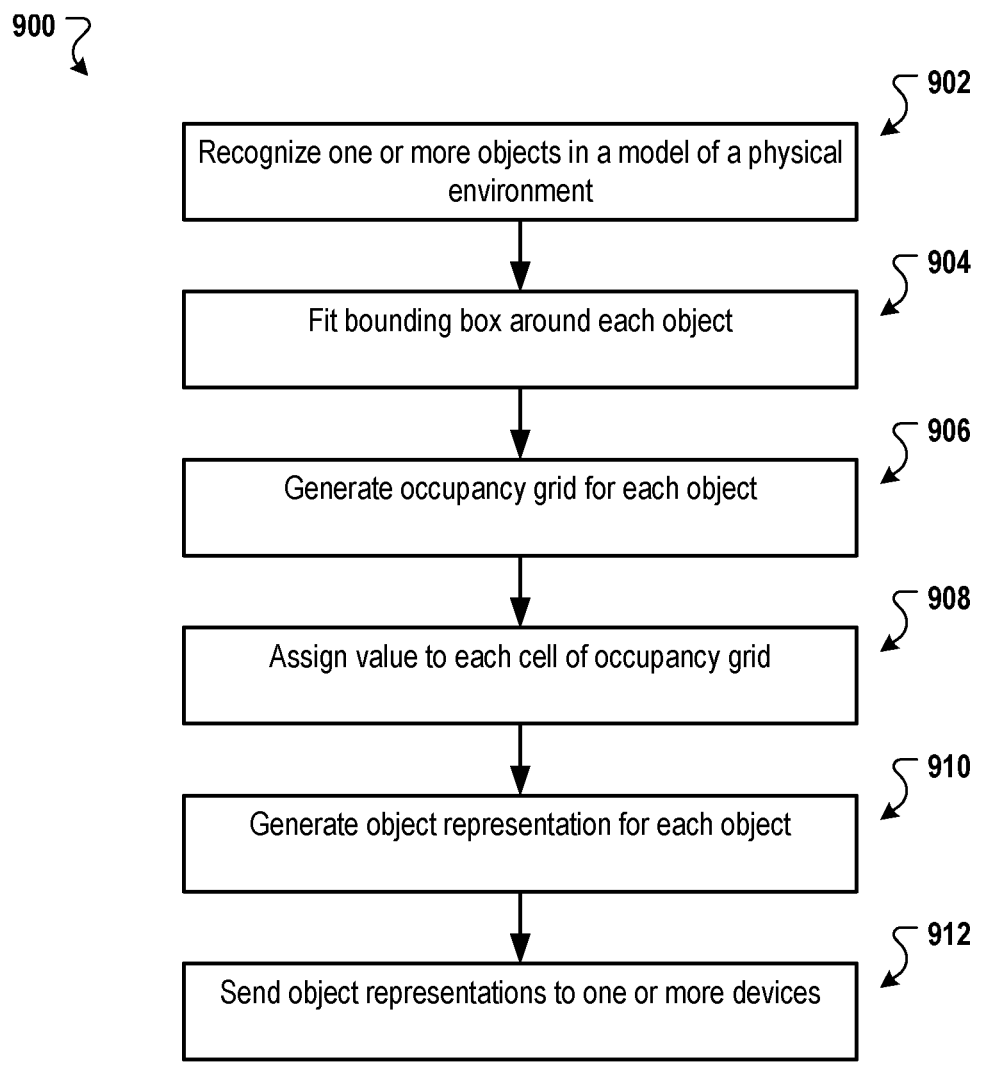
FIG. 9 is a flow chart of an example process for generating object representations for objects.

FIG. 9 is a flow chart of an example process 900 for generating object representations for objects. The process 900 can be performed, for example, by the passable world module 620 of FIGS. 6A and 6B, which can be implemented on one or more computers.

One or more objects are recognized in a model of a physical environment (902). The model can include a set of voxels that represent the physical environment. As described above, the voxels can be generated by a DMM engine based on images and associated data received from sensors of one or more devices. The objects can be recognized using a machine learning model, e.g., a trained deep neural network. The DMM engine can label each voxel in which an object is recognized with a semantic label that indicates a type of object recognized in the voxel.

A bounding box is fit around each recognized object (904). For example, the edges of the object can be detected and the bounding box can be fit around the object such that all of the edges are within the box. The bounding box can be fit such that it is as small as possible while ensuring that the entire object is within the bounding box.

An occupancy grid is generated for each object (906). An occupancy grid can represent the areas of the environment occupied by the object. In some implementations, the occupancy grid includes a three-dimensional grid. The three-dimensional grid can encompass the bounding box fit around the object.

A value is assigned to each cell of the occupancy grid for each object (908). Each cell that includes a portion of the object can be assigned a first value. Each cell that does not include any portion of the object can be assigned a second value different from the first value. For example, each cell that includes a portion of the object can be assigned a value of one and each cell that does not include a portion of the object can be assigned a value of zero. Other appropriate values can also be used.

An object representation is generated for each object (910). An object representation can include data about the object. For example, an object representation for an object can include a map identifier that identifies the map and optionally the version of the map where the object is located, a unique object identifier for the object, a semantic label identifier that indicates the type, or other semantic representation, of the object, bounding box information for the bounding box that represents the location of the object in a map or mesh, and occupancy grid information that indicates the location of each cell of the grid and, for each cell, a value that indicates whether a portion of the object is in the cell.

The object representation for each object is sent to one or more devices (912). The object representations can be sent to one or more AR display devices. The AR devices can then use the object representations to place AR content with the objects.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 10:
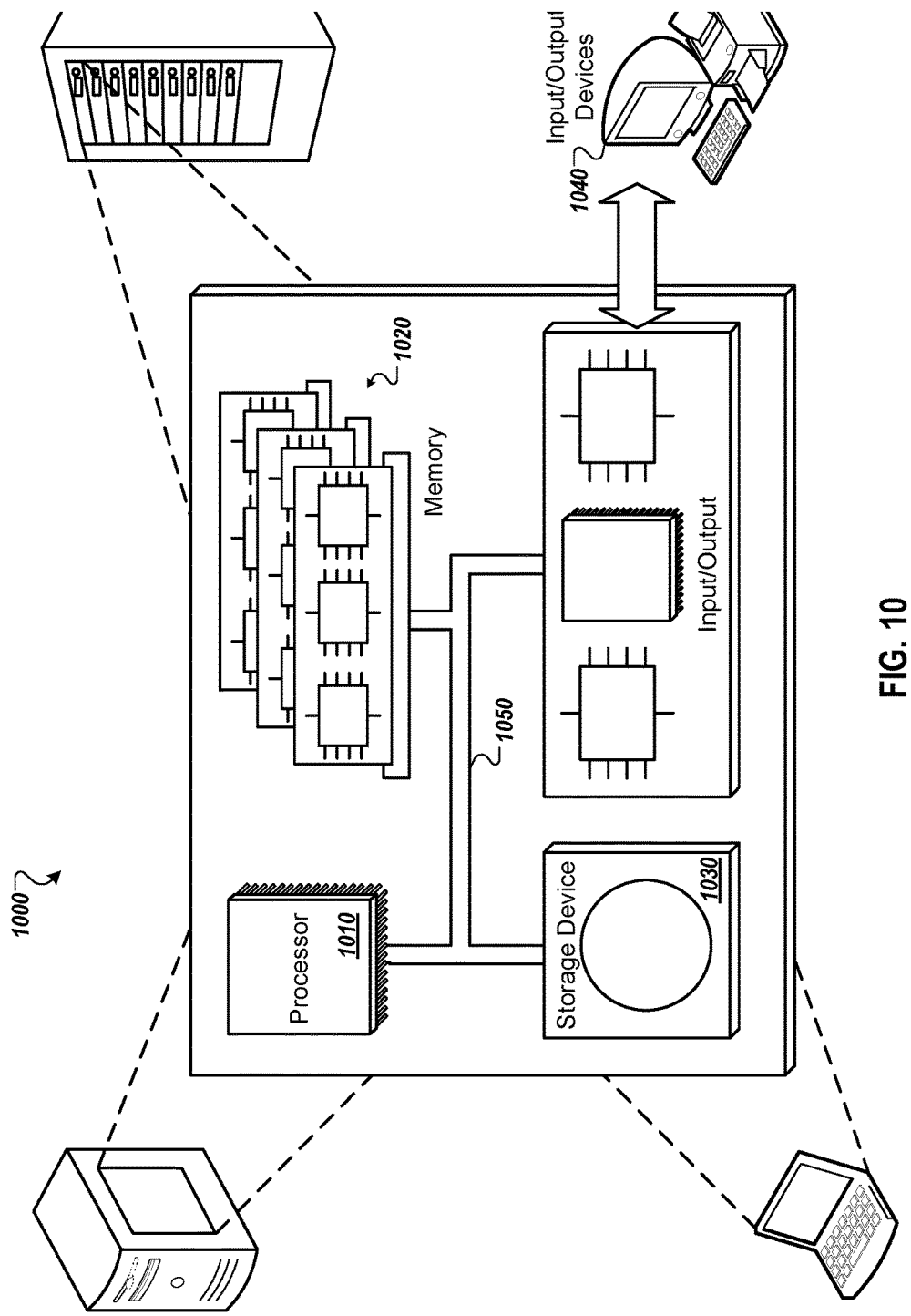
FIG. 10 is a block diagram of a computing system that can be used in connection with computer-implemented methods described in this document.

An example of one such type of computer is shown in FIG. 10, which shows a schematic diagram of a generic computer system 1000. The system 1000 can be used for the operations described in association with any of the computer-implemented methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method performed by one or more data processing apparatus, the method, comprising:
   recognizing one or more objects in a model of a physical environment generated using images of the physical environment;
   for each object of the one or more objects:
      fitting a bounding box around each object;
      generating an occupancy grid within the bounding box around each object, wherein the occupancy grid includes a plurality of cells;
      assigning a value to each cell of the occupancy grid based on whether the cell includes a portion of each object; and
      generating an object representation that includes information describing the occupancy grid for each object; and
   sending the object representations to one or more devices.

2. The computer-implemented method of claim 1, wherein assigning a value to each cell of the occupancy grid based on whether the cell includes a portion of each object, comprises:
   assigning a first value to each cell that includes a portion of each object; and
   assigning a second value different from the first value to each cell that does not include any portion of each object.

3. The computer-implemented method of claim 1, comprising:
   detecting a change to a given object of the one or more objects;
   generating a new occupancy grid for the given object; and
   sending the new occupancy grid for the given object to the one or more devices rather than an updated model of the physical environment.

4. The computer-implemented method of claim 3, wherein each device of the one or more devices update a local mesh for the physical environment using the new occupancy grid for the given object.

5. The computer-implemented method of claim 1, wherein the model comprises a plurality of voxels that represent the physical environment.

6. The computer-implemented method of claim 5, further comprising assigning a semantic label to each voxel based on a type of object recognized in the voxel.

7. The computer-implemented method of claim 6, further comprising clustering voxels based on the semantic label for each voxel.

8. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      recognizing one or more objects in a model of a physical environment generated using images of the physical environment;
      for each object of the one or more objects:
         fitting a bounding box around each object;
         generating an occupancy grid within the bounding box around each object, wherein the occupancy grid includes a plurality of cells;
         assigning a value to each cell of the occupancy grid based on whether the cell includes a portion of each object; and
         generating an object representation that includes information describing the occupancy grid for each object; and
      sending each object representations to one or more devices.

9. The computer-implemented system of claim 8, wherein assigning a value to each cell of the occupancy grid based on whether the cell includes a portion of each object, comprises:
   assigning a first value to each cell that includes a portion of each object; and
   assigning a second value different from the first value to each cell that does not include any portion of each object.

10. The computer-implemented system of claim 8, wherein the operations comprise:
    detecting a change to a given object of the one or more objects;
    generating a new occupancy grid for the given object; and
    sending the new occupancy grid for the given object to the one or more devices rather than an updated model of the physical environment.

11. The computer-implemented system of claim 10, wherein each device of the one or more devices update a local mesh for the physical environment using the new occupancy grid for the given object.

12. The computer-implemented system of claim 8, wherein the model comprises a plurality of voxels that represent the physical environment.

13. The computer-implemented system of claim 12, wherein the operations comprise assigning a semantic label to each voxel based on a type of object recognized in the voxel.

14. A non-transitory, computer-readable medium storing one or more instructions executable by a computer system to perform operations, comprising:
    recognizing one or more objects in a model of a physical environment generated using images of the physical environment;
    for each object of the one or more objects:
       fitting a bounding box around each object;

generating an occupancy grid within the bounding box around each object, wherein the occupancy grid includes a plurality of cells;

assigning a value to each cell of the occupancy grid based on whether the cell includes a portion of each object; and generating an object representation that includes information describing the occupancy grid for each object; and sending each object representations to one or more devices.

15. The non-transitory, computer-readable medium of claim 14, wherein assigning a value to each cell of the occupancy grid based on whether the cell includes a portion of each object, comprises:

assigning a first value to each cell that includes a portion of each object; and assigning a second value different from the first value to each cell that does not include any portion of each object.

16. The non-transitory, computer-readable medium of claim 14, wherein the operations comprise:

detecting a change to a given object of the one or more objects;

generating a new occupancy grid for the given object; and sending the new occupancy grid for the given object to the one or more devices rather than an updated model of the physical environment.

17. The non-transitory, computer-readable medium of claim 16, wherein each device of the one or more devices update a local mesh for the physical environment using the new occupancy grid for the given object.

18. The non-transitory, computer-readable medium of claim 14, wherein the model comprises a plurality of voxels that represent the physical environment.

19. The non-transitory, computer-readable medium of claim 18, wherein the operations comprise assigning a semantic label to each voxel based on a type of object recognized in the voxel.

20. The non-transitory, computer-readable medium of claim 19, wherein the operations comprise clustering voxels based on the semantic label for each voxel.

* * * * *